United States Patent [19]

Yasuoka et al.

[11] Patent Number: 4,984,231
[45] Date of Patent: Jan. 8, 1991

[54] OPTICAL INFORMATION PHASE CHANGE RECORDING MEDIUM HAVING DOUBLE PROTECTIVE LAYER

[75] Inventors: Hiroshi Yasuoka; Norio Murase, both of Kokubunji; Motoyasu Terao, Tokyo; Tetsuya Nishida, Koganei; Keikichi Andoo, Musashino; Masahiro Ojima, Tokyo, all of Japan

[73] Assignee: Hitachi, Ltd., Tokyo, Japan

[21] Appl. No.: 147,362

[22] Filed: Jan. 22, 1988

[30] Foreign Application Priority Data

Jan. 23, 1987 [JP] Japan .................. 62-12357

[51] Int. Cl.⁵ ............................... G11B 7/24
[52] U.S. Cl. .................. 369/275.1; 369/275.002; 369/275.001; 369/286; 369/288; 369/275.2; 369/275.1; 430/945; 346/135.1
[58] Field of Search .......... 369/275.1, 284, 275.2, 369/286, 275.3, 288, 275.4, 100, 275.5; 346/135.1, 137, 762; 430/945; 428/694

[56] References Cited

U.S. PATENT DOCUMENTS

| | | | |
|---|---|---|---|
| 4,176,277 | 11/1979 | Bricot et al. | 250/316.1 |
| 4,405,862 | 9/1983 | Bricot et al. | 350/318 |
| 4,579,777 | 4/1986 | Honguu et al. | 360/131 |
| 4,610,912 | 9/1986 | Takahashi et al. | 428/694 |
| 4,633,273 | 12/1986 | Watanabe et al. | 346/135.1 |
| 4,658,388 | 4/1987 | Ishiwatari et al. | 369/275 |
| 4,801,499 | 1/1989 | Aoyama et al. | 369/13 |

FOREIGN PATENT DOCUMENTS

| | | | |
|---|---|---|---|
| 52-02783 | 3/1977 | Japan . | |
| 56-61048 | 5/1981 | Japan | 369/275 |
| 60-38746 | 2/1985 | Japan | 369/284 |

*Primary Examiner*—Stuart S. Levy
*Assistant Examiner*—Hoa Nguyen
*Attorney, Agent, or Firm*—Antonelli, Terry, Stout and Kraus

[57] ABSTRACT

An optical information recording carrier which comprises an information recording film susceptible to a change in atomic arrangement upon exposure to a recording beam, a first transparent film for preventing diffusion of heat generated in the recording film upon exposure to the recording beam and provided on each side of the recording film, a second transparent film for diffusing the heat in the in-plane direction of the film and provided on at least one outside thereof, and an organic member further provided on at least one outside thereof, the recording beam being irradiated onto the recording film through the organic member has distinguished characteristics of repeated recordings and erasings.

20 Claims, 1 Drawing Sheet

OPTICAL INFORMATION PHASE CHANGE RECORDING MEDIUM HAVING DOUBLE PROTECTIVE LAYER

BACKGROUND OF THE INVENTION

This invention relates to a rewritable optical information recording carrier which utilizes a phase change between a crystalline state and an amorphous state, and more particularly to an optical information recording carrier having distinguished characteristics of repeated recordings and erasings.

The conventional optical recording carriers of phase change type use organic members such as replica-formed disk substrates of ultraviolet-curable resins, injection-molded plastic substrates, etc. In order to prevent the recording film from deformation or evaporation during the recording or erasing, the recording film is further protected with a transparent inorganic film, which is typical of a $SiO_2$ film. That is, the recording film of phase change type is sandwiched between transparent protective films of inorganic material, which are further covered each with an organic layer on the outside. These types of optical information recording carriers are disclosed, for example, in Japanese Patent Publication No. 52-2783, Japanese Patent Application Kokai (Laid-open) No. 60-38746, etc.

When the conventional optical information recording carrier of phase change type is exposed to a laser beam to carry out recording or erasing, the temperature of the recording film of phase change type will be increased to higher than the melting point and also the temperature of the organic layers will be increased approximately to the melting point of the recording film, so that the organic layers are much liable to undergo deformation or deterioration. In other words, deformation or deterioration of the organic layer will be increased and accumulated as the recording and erasing are repeated, and ultimately recording, erasing or read-out by light cannot be continued.

SUMMARY OF THE INVENTION

An object of the present invention is to provide a rewrittable optical information recording carrier of phase change type having distinguished characteristics of repeated recordings and erasings, which can solve the problem.

The present optical information recording carrier is characterized by providing a first transparent film having a low thermal conductivity and a second transparent film having a larger thermal conductivity than that of the first transparent film by lamination between a recording film of phase change type and an organic member such as an organic layer, or an organic substrate.

On the recording film of phase change type, data are recorded through a change in the order of atomic arrangement, which includes, for example, a change between an amorphous or nearly amorphous state and a crystalline state in higher order or between two crystalline states of different crystal forms.

A first transparent film in contact with the recording film can prevent diffusion of the heat generated in the recording film, whereby the temperature of the recording film can be effectively increased by a laser of lower power. A second transparent film to be provided at the outside of the first transparent film has a higher thermal conductivity than that of the first transparent film.

Thus, the heat generated in the recording film and passed through the first transparent film diffuses through the second transparent film in the in-plane direction of the second transparent film, and thus the temperature increase of the organic member can be suppressed. Furthermore, the period of time while the organic member is exposed to the elevated temperature can be shortened thereby and the deformation and deterioration of the organic member can be prevented. By making the product of specific heat by density of the second transparent film larger than that of the first transparent film, the temperature increase of the second transparent film due to the diffused heat can be further lowered and the action to suppress the temperature increase of the organic member can be effectively attained. When the arrangement order of the first transparent film and the second transparent film is reversed, the heat loss will be increased during the recording or erasing, lowering the recording sensitivity, but the thus obtained recording carrier can be still practically used. The second transparent film alone cannot carry out recording under the current semiconductor laser power level condition (30 mW) owing to its power shortage. When a third transparent film is provided on the opposite side of the two first and second transparent films to the recording film, that is, on the side to the organic member, the effect of suppressing the temperature increase in the organic member is more improved. The first transparent film may be made from an organic material or an inorganic material. The organic material has a high heat-shielding effect, but the inorganic material is preferable in view of less deformation. The second transparent film is preferably made from an inorganic material. Particularly preferable inorganic material has a composition approximating to one of BN, $Si_3N_4$, AlN, $Al_2O_3$, CaO, MgO and $TiO_2$.

The difference in the thermal conductivity between the first and second transparent films is preferably at least 0.01 J/sec.cm.deg, more preferably at least 0.05 J/sec.cm.deg. The thermal conductivity of the second transparent film is preferably at least 0.05 J/sec.cm.deg, and more preferably at least 0.1 J/sec.cm.deg. The thermal conductivity of the first transparent film is preferably at most 0.03 J/sec.cm.deg, and more preferably at least 0.02 J/sec.cm.deg.

When a metallic substrate is used, the two transparent films for use in the present invention are preferably provided not between the recording film and the substrate, but on the opposite side of the recording film to the substrate.

When a transparent substrate is used, it is preferable to provide two transparent films also on the opposite side of the recording film to the substrate, and the more remote transparent film from the recording film may be opaque. For example, when the more remote film is a metallic film of Al, Pd, Au, Pt, Ti, V, Cr, Co, Ni, Cu, Nb, Mo, Ta or W, it also has an effect on the heat release and thus has an effect on prevention of the temperature increase of the organic member, an adhesive film, etc. laid thereon.

Materials for use in the first transparent film having a low thermal conductivity according to the present invention include, for example, oxides, nitrides, fluorides, sulfides, selenides, carbides, borides, carbon, boron, heat-resistant organic materials, and specifically they are $ZrO_2$, SiO, $SiO_2$, $B_2O_3$, $MgF_2$, ZnS, $Sb_2S_3$, $Sb_2Se_3$, Teflon, polyamide, polyimide, etc.

The effect of the double layer structure of transparent film, that is, not of the second transparent film alone, but a combination thereof with the first transparent film, is not only the thermal effect, but also an optical effect. In an optical disk of phase change type, a change in the index of refraction of a recording film is read out as a change in the reflectivity by virtue of the effect of multiple interference between the face side and the back side of the recording film. That is, the larger the difference between the index of refraction of a recording film (3 to 4) and that of a first transparent film (e.g., 1.5), the higher the reflectivity between the recording film and the first transparent film and the higher the effect of multiple interference. Thus, the read-out signal intensity becomes higher. When a second transparent film having a large index of refraction, for example, 2 or more, is used alone, there is such a problem that the read-out signal intensity will be lowered. Thus, the use of double layer structure assures an effect on a higher read-out signal effect together with said thermal effect.

DESCRIPTION OF THE PREFERRED EMBODIMENTS

Example 1

Figure 1:
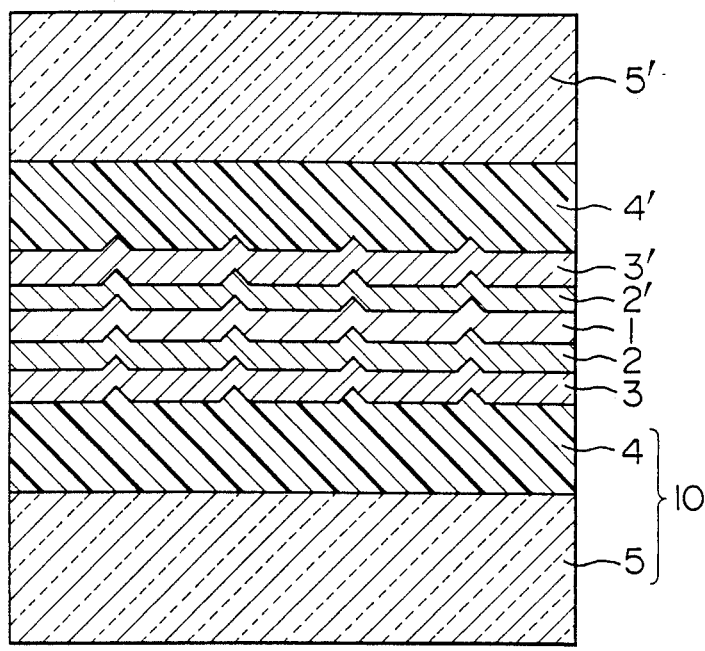
FIG. 1 is a cross-sectional view of an optical information recording carrier according to one embodiment of the present invention.

As shown in FIG. 1, the present optical recording carrier comprises a recording film 1 of phase change type, based on In-Se system, a first transparent protective film 2 (a $SiO_2$ film in this example) for preventing the deformation or sublimation of the recording film 1 and improving a heat-increasing efficiency, a second transparent film 3 (a $Si_3N_4$ film in this example) for releasing the heat, an organic layer 4 composed of an ultraviolet-curing resin having concave parts or convex parts that constitute tracking guide grooves or intermittent tracking marks, and/or header pits, and a glass substrate 5. In the optical information medium according to the present embodiment, two transparent protective films 2' and 3', an organic layer 4' and a glass substrate 5' are further provided on the opposite side of the recording film 1 to the substrate 5.

The optical information recording carrier according to the present embodiment is prepared in the following manner.

At first, a ultraviolet-curing resin 4 is applied to a glass substrate 5, pressed thereto by a stamper (not shown in the drawing) and exposed to ultraviolet irradiation. By removing the glass substrate 5 from the stamper, a replica substrate 10 having tracking guide grooves or intermittent tracking marks and/or header signals as formed on the surface can be obtained. The replica substrate 10 may be an injection-molded organic substrate of plastics. Then, a film 3 of $Si_3N_4$ is vapor-deposited thereon to a thickness of about 1,000 Å or more, and a transparent protective film 2 of $SiO_2$ is vapor-deposited thereon to a thickness of about 1,000 Å. Then, a recording film 1 of In-Se system is formed thereon. Likewise, a film 2' of $SiO_2$ is vapor-deposited on the recording film 1 and a film 3' of $Si_3N_4$ is vapor-deposited thereon, and a glass substrate 5' is pasted thereto through an ultraviolet-curing resin 4'.

$SiO_2$ and $Si_3N_4$ are used for the first transparent inorganic protective film and the second transparent inorganic film, respectively, and have thermal conductivities of 0.015 and 0.15 (J/sec.cm.deg.), respectively, specific heats of 0.8 and 0.74 (J/g.deg.), respectively, and densities of 2.2 and 3.2 (g/cm$^3$), respectively.

The optical information recording carrier according to the present embodiment is in a vertically symmetrical structure with respect to the recording film 1, and thus a light beam can be irradiated from the upside or the down side of the carrier.

According to the present embodiment, more than $10^3$ repeated rewrittings, i.e. recordings and erasings between the nearly amorphous state and the crystalline state could be carried out.

Example 2

Figure 2:
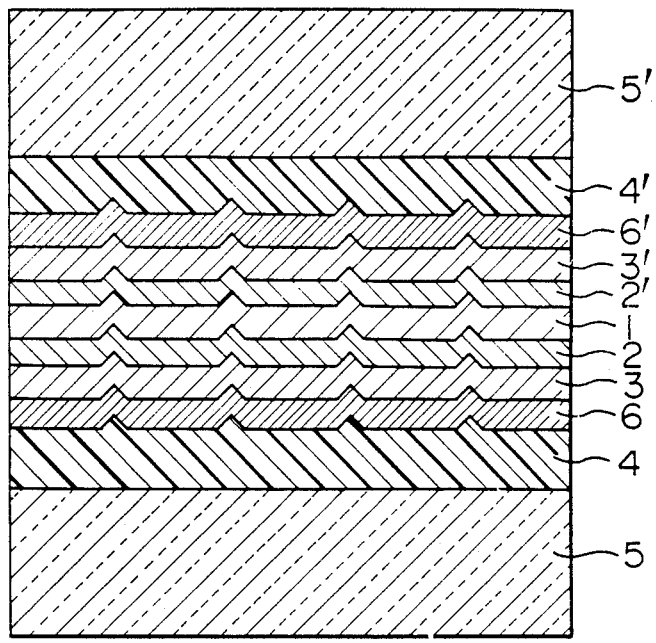
FIG. 2 is a cross-sectional view of an optical information recording carrier according to another embodiment of the present invention.

In FIG. 2, a cross-sectional structure of an optical information recording carrier according to another embodiment of the present invention is shown, where a third transparent film 6 or 6' having a low thermal conductivity is provided between the $Si_3N$ film 3 or 3' and the ultraviolet-curing resin layer 4 or 4' to prevent the temperature increase of the ultraviolet-curing resin layer 4 or 4' by the heat absorbed in the recording film 1. With this structure of the optical information recording carrier, more than $10^3$ repetitions of recordings and erasings could be carried out.

In Examples 1 and 2, when a film of at least one of BN, AlN, $Al_2O_3$, CaO, TiO and MgO is used in place of the $Si_3N_4$ film as the second transparent film 3 or 3', a higher thermal conductivity and a higher effect on prevention of deformation can be obtained. As the first transparent film 2 or 2', a film of $ZrO_2$, $B_2O_3$, $MgF_2$, ZnS, $Sb_2S_3$, $Sb_2Se_3$, Teflon, polyamide, polyimide, etc. can be used in place of the $SiO_2$ film.

As a result of investigation of various combinations of these films, it has been found that, when a difference in the thermal conductivity between the first and second transparent film is 0.01 J/sec.cm.deg. or more, a remarkable effect can be obtained, and when the difference is 0.05 J/sec.cm.deg. or more, a more remarkable effect can be obtained. Furthermore, it has been found that the thermal conductivity of the second transparent film 3 or 3' is preferably 0.05 J/sec.cm.deg. or more and more preferably 0.1 J/sec.cm.deg. or more, and the thermal conductivity of the first transparent film 2 or 2' is preferably 0.03 J/sec.cm.deg. or less, and more preferably 0.02 J/sec.cm.deg. or less. It has been further found that the preferable thermal conductivity of the third transparent film 6 or 6' is the same as that of the first transparent film 2 or 2'.

In Examples 1 and 2, the index of refraction of the first transparent film 2 or 2' gives an influence upon the reflectivity relating to the read-out signal intensity. For example, when a $SiO_2$ film having an index of refraction of 1.5 is combined with a recording film having an index of refraction of 3 to 4, a reflectivity based on the multiple interference is 30% or more, whereas when a $ZrO_2$ film having an index of refraction of 2.0 is combined with said recording film, the reflectivity based on the multiple interference is about 20%. In order to obtain a readable reflectivity of 20% or more, it is necessary to use a material having an index of refraction of 2.0 or less for the first transparent film 2 or 2'.

In Examples 1 and 2, an effect on prevention of deformation can be obtained when one of the substrates 5 and 5' is a metallic substrate. In FIGS. 1 and 2, the second transparent film 3 or 3' on the light-unirradiated side may be opaque and a metal can be used for the opaque film, where a good result can be obtained with Al, Pd, Au, Pt, Ti, V, Cr, Cu, Co, Ni, Nb, Mo, To and W.

When the arrangement order of the first transparent film 2 or 2' and the second transparent film 3 or 3' is reversed, the recording sensitivity is lowered, but the thus obtained recording carrier can be still practically used.

According to the present invention, the temperature increase of an organic member can be suppressed, and recordings and erasings, that is, re-writings, can be carried out in a very large number of repetitions.

What is claimed is:

1. An optical information recording carrier, which comprises a recording film of phase change type and an organic member having concave or convex grooves or indents, a first transparent film having a low thermal conductivity provided proximate to the recording film and a second transparent film having a higher thermal conductivity than that of the first transparent film being provided farther away from the recording film than the first transparent film, the first and second transparent films being provided by lamination between the recording film and the organic member.

2. An optical information recording carrier according to claim 1, wherein a product of the specific heat and the density of the second transparent film is larger than that of the first transparent film.

3. An optical information recording carrier according to claim 1, wherein at least the second transparent film is made from an inorganic material.

4. An optical information recording carrier according to claim 1, wherein the first transparent film and the second transparent film are successively provided.

5. An optical information recording carrier according to claim 4, wherein a third transparent film having a low thermal conductivity is provided between the second transparent film and the organic member.

6. An optical information recording carrier, which comprises an information recording film susceptible to a change in atomic arrangement upon exposure to a recording beam, a pair of first transparent films arranged so that a respective first transparent film having a low thermal conductivity is provided on each side of the information recording film, a second transparent film having a higher thermal conductivity than that of the first transparent film being provided by lamination on at least one of the first transparent films in a direction away from the information recording film, and an organic member disposed outwardly of the second transparent film in a direction away from the information recording film, the recording beam being irradiated through the organic member.

7. An optical information recording carrier according to claim 6, wherein the thermal conductivity of the first transparent film is at most 0.03 J/sec.cm.deg.

8. An optical information recording carrier according to claim 6, wherein the thermal conductivity of the first transparent film is at most 0.02 J/sec.cm.deg. or less.

9. An optical information recording carrier according to claim 7, wherein the thermal conductivity of the second transparent film is at least 0.05 J/sec.cm.deg.

10. An optical information recording carrier according to claim 8, wherein the thermal conductivity of the second transparent film is 0.1 J/sec.cm.deg.

11. An optical information recording carrier according to claim 6, wherein a third transparent film having a low thermal conductivity is provided between the second transparent film and the organic member.

12. A optical information recording carrier according to claim 11, wherein the thermal conductivity of the third transparent film is at most 0.03 J/sec.cm.deg.

13. An optical information recording carrier according to claim 11, wherein the thermal conductivity of the third transparent film is at most 0.02 J/sec.cm.deg.

14. An optical information recording carrier according to claim 6, wherein the organic member is an organic layer formed on a transparent substrate, the organic member having tracking grooves or marks.

15. An optical information recording carrier according to claim 6, wherein the organic member is an injection-molded organic substrate having tracking grooves or marks.

16. An optical information recording carrier which comprises an information recording film susceptible to a change in atomic arrangement upon exposure to a recording beam, a pair of first transparent films arranged so that a respective first transparent film for preventing a diffusion of heat generated in the recording film upon exposure to the recording beam is provided on each side of the recording film, a second transparent film for diffusing the heat in the in-plane direction of the second transparent film disposed outwardly of one of the first transparent films in a direction away from the recording film, and an organic member further provided outwardly of the second transparent film in the direction away from the recording film, the recording beam being irradiated onto the recording film through the organic member.

17. An optical information recording carrier according to claim 16, wherein a difference in the thermal conductivity between the first and second transparent films is at least 0.01 J/sec cm.deg.

18. An optical information recording carrier according to claim 16, wherein a difference in the thermal conductivity between the first and second transparent films is at least 0.05 J/sec.cm.deg.

19. An optical information recording carrier according to claim 16, wherein a metallic film is provided on the first transparent film on the side of the recording film opposite to the organic member through which the recording beam is irradiated to the recording film.

20. An optical information recording carrier according to claim 16, wherein the recording film has an index of refraction of at most 3 to 4 and the first transparent film has an index of refraction of 2.0.

* * * * *